Jan. 9, 1923.
L. W. CHISM.
TRACTION DEVICE.
FILED MAY 31, 1921.
1,441,214
3 SHEETS-SHEET 1
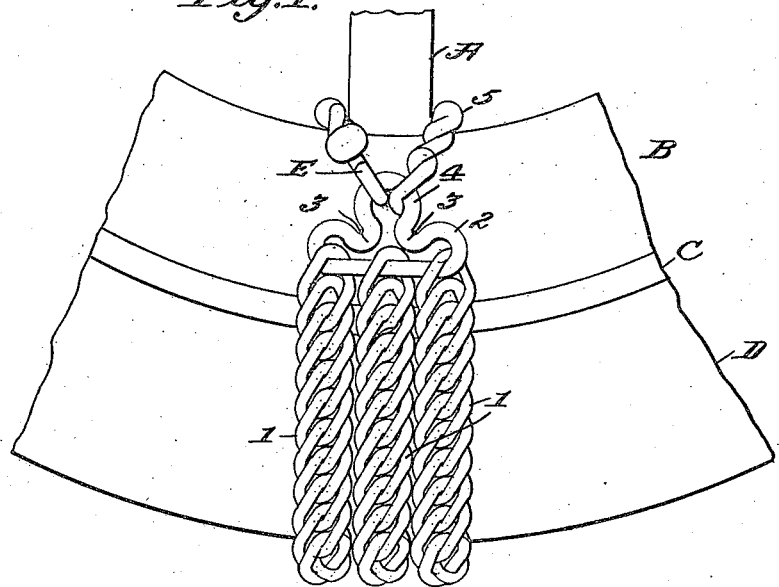
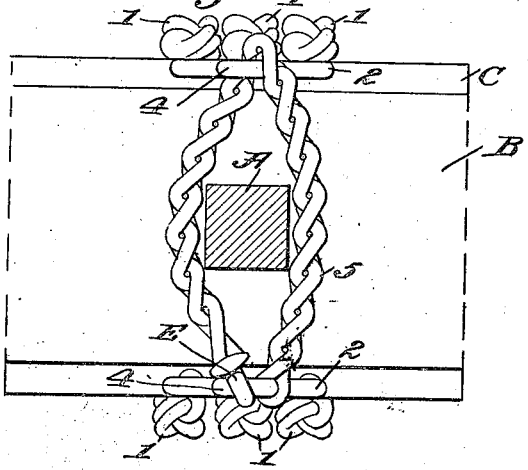
Inventor:
Louis W. Chism,
by Richard E. Babcock
Att'y.

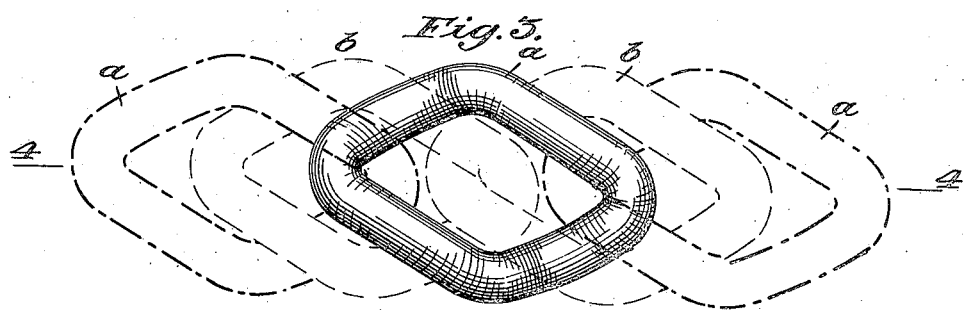
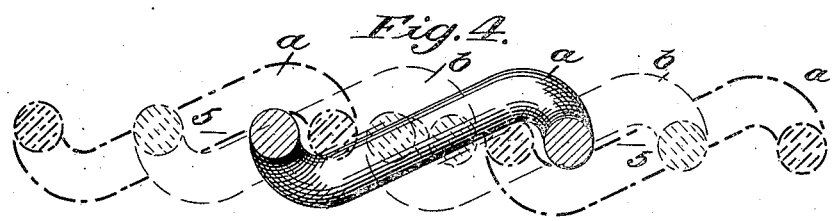
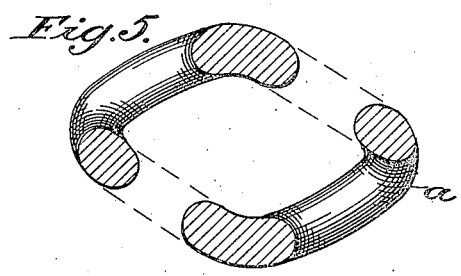
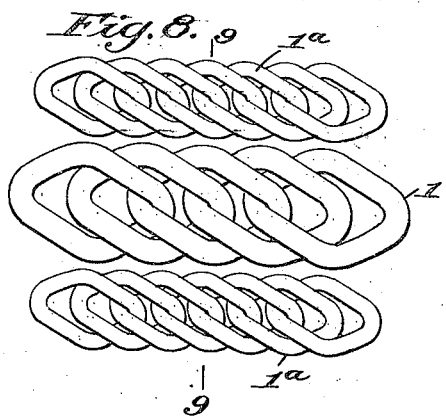
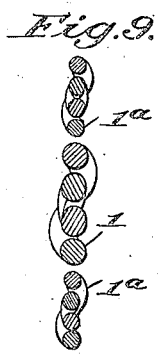

Jan. 9, 1923.
L. W. CHISM.
TRACTION DEVICE.
FILED MAY 31, 1921.
1,441,214
3 SHEETS-SHEET 3
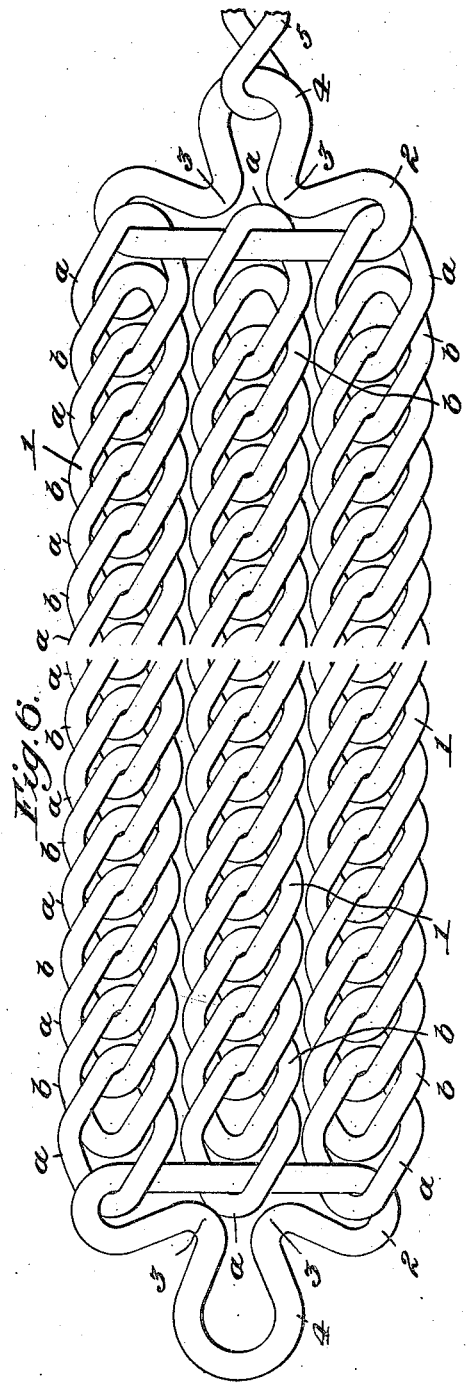
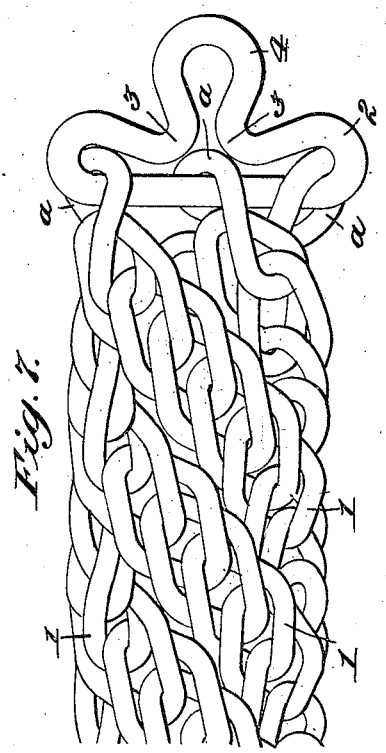
Inventor:
Louis W. Chism,
by Richard E. Babcock
Att'y.

Patented Jan. 9, 1923.

1,441,214

UNITED STATES PATENT OFFICE.

LOUIS W. CHISM, OF SPRINGFIELD, MASSACHUSETTS.

TRACTION DEVICE.

Application filed May 31, 1921. Serial No. 473,605.

*To all whom it may concern:*

Be it known that I, LOUIS W. CHISM, a citizen of the United States, residing at Springfield, in the county of Hampden and State of Massachusetts, have invented certain new and useful Improvements in Traction Devices, of which the following is a specification.

This invention relates to cross-chains or traction elements and traction units embodying said elements more particularly for use on pneumatic tires and especially valuable on the very large or giant size pneumatic tires used on heavy trucks, and is capable of use with advantage on the smaller sizes of pneumatic tires and, for that matter, on all sizes of solid tires also, the weight and size of the individual cross-chains being proportionate to the size of the tire to which the particular unit is to be applied.

The object more especially in view is to provide a cross-chain which may be mounted on the wheel in such manner as to prevent, or to limit, peripheral movement of the unit as a whole on the wheel and which, when thus mounted, will not heat, burn, rub, blister, cut or puncture the same, which may be readily applied to even the greatest size giant pneumatic tire while the wheel is in a mud-hole, and which may also be used on all tires, which may be used either as a part of a creeping chain or as part of an anchored unit, or unit mounted in such manner as to prevent, or limit, its movement peripherally of the wheel, which will have a relatively smooth regular surface and will have a large bearing surface on the tire, which will be very flexible, like the usual chain, in all directions, which will have no strands or parts to be frayed out, bent and driven into the tire, and which cannot roll to such position that its links will be presented edgewise of, and cut, the tire. A further object is to so combine a cross-chain or plurality of cross-chains of the above mentioned type with means for holding it in a relatively fixed peripheral position on the tire in such way that the holding means and the terminal links will not contact with the tire and so that the ends of the cross-chains will be held in spaced relation so that they cannot become bunched and so, by massing, form a lump to rub against and blister the tire. A still further object of my invention is to provide an automatically positioned unit which will have no positive connection with the elements of the wheel in such manner as to limit its ability to creep or to be moved in a transverse plane about the tire, though for convenience the tag chain may be passed on opposite sides of an intervening spoke, as shown in the drawing, for the purpose of limiting the peripheral movement of the unit with relation to the tire and felly. The automatic action is obtained by having the tread portion of the unit heavier than the tag portion or other intervening part or portions, and so far as this particular object is concerned, this is all that is necessary to attain it, so that no particular type or construction of traction element or tread element is necessary so long as it is heavier than the other portions or parts of the unit.

One feature of the invention consists in using multiple link cross-chains, in which the links have a certain approximate degree of substantially uniform twist. Another feature is the employment of such a cross-chain, that is, a multiple link cross-chain in which the relation of the cross-sectional area of the end bar of each link has a certain definite relation to the area enclosed by said link, all of the links of said cross-chain being of substantially the same size and shape. A further feature consists in providing an anchored traction unit, that is anchored or restricted to some extent against peripheral movement, though capable of having a wide range of movement transversely of the wheel, for heavy truck pneumatic tires, in which unit two or more heavy cross-chains will be located very closely parallel to, and adjacent to, each other in order that in use, especially in muddy going, they may strike against each other with hammer-like blows and so keep each other free of mud and prevent each other from becoming clogged and the unit as a whole from becoming slick. A further feature is the combining of a plurality of such traction elements or cross-chains with anchoring means for holding the terminals of the cross-chains in spaced relation but closely adjacent to each other in order that the plurality of cross-chains may be longitudinally twisted about each other to provide a shortened thick pliable rope which will not have any abrupt projections to damage the tire and which may be used in this manner as a special emergency device in case the truck gets into a deep mud-hole or a stretch of muddy road having no firm bed or the bed of which is deeply covered with mud. A further feature is that by making the tread portion heavier than the tag chain or fastening means the chain and wheel combine so that the centrifugal force generated by the rotation of the wheel will throw the center of the heaviest portion in axial alignment with the exact central vertical plane of the wheel and so keep the tread portion of the unit in correct transverse position on the tire and prevent the connecting devices, hooks or the like from working around on the tread of the tire and eliminating all need for special anchoring devices either temporarily or permanently applied to the spokes, felly or other part of the wheel.

I have set forth briefly the primary objects and some of the features of my invention above, other objects and features will be brought out in the following detail description of my invention.

Usually traction devices are applied only to the power or drive wheels of the truck or machine, but it is found that it is especially desirable in muddy sections or in slippery going to equip all wheels, though a single unit applied to each front wheel will suffice, the advantage being that this enables the steering wheels to take hold and bite into the sides of ruts and will enable the driver to steer the truck out of ruts and avoid following the path of others and the necessity of sliding and skidding where they did.

In the accompanying drawings:

Figure 1 represents a side elevation of a segment of a wheel having a giant size pneumatic tire with a traction unit of multiple link construction cross-chains combined therewith;

Figure 2, a plan view of Figure 1, looking from the hub toward the felly;

Figure 3, a detail view of a portion of one of the cross-chains shown in Figure 1, the present illustration being made according to exact scale and of the actual size of a device or unit actually made and tested out with satisfactory results;

Figure 4, a sectional view on the line 4—4 of Fig. 3;

Figure 5, a sectional view on the line 5—5 of Fig. 4;

Figure 6, a detail view of a three-strand unit, the tab-chain and cross-chains being broken away, this view being made, as to the links of the cross-chains and the holders 2 to exact scale and of one-half the actual size of a unit actually made and tested with satisfactory results, being the same device referred to with regard to Figure 3;

Figure 7, a view, on the same scale as Fig. 6, of substantially a one-half length of said unit, the tread or cross-chains of which are illustrated as longitudinally twisted about each other to form a substantially smooth thick chain rope for temporary use in special emergencies;

Figure 8, a fragmentary view of a part of the tread portion, on the same scale as Figures 6 and 7, of a modified unit in which the two outside cross-chains are smaller in cross-section than the central cross-chain; and Figure 9 represents a sectional view on the line 9—9 of Figure 8.

There seems no occasion to add further to the above illustration, in which two forms only of my invention are set forth, it being obvious that multiple link cross-chains of the above type may be employed having any desired multiple of links and that as many cross-chains per unit, for an independent unit type of traction device, may be employed as desired and that when so arranged they will be relatively close together, or for that matter may touch, to furnish a mat or pad which will not sink into the tire as deeply as a single cross-chain, this arrangement being especially desirable on giant pneumatic tires of heavy trucks. It is also apparent that these independent units may be employed, if desired, with any suitable anchoring devices in substitution for the present tab-chains, although such additional or substitute anchoring devices are not at all essential, but simply add to the cost of the equipment, as it is found that by making the tread portion of the traction unit heavier than the tab-chain or other securing means, the centrifugal force generated by the rotation of the wheel will throw the center or point of gravity of the tread portion radially outward into the central vertical plane of the wheel and keep it there so long as the wheel is rotating, thus keeping the traction unit in correct position on the wheel and keeping the connecting hooks from riding around onto the tread of the tire, and this automatic positioning action follows regardless of the type or construction or traction chain or other traction or tread element so long as the tread element portion employed is heavier than any other portion of the unit. Also, it is obvious that the particular type or construction of cross-chain herein set forth as one of the features of this invention may be employed as a cross-chain of a creeping type of anti-skid or traction assemblage.

For the giant pneumatic tires it is necessary to use independent units anchored against peripheral movement, or whose movement is only to a limited extent peripherally, with relation to the tire and wheel felly in order that the wheel cannot move independently of the traction unit, but must move therewith even on steep hills irrespective of the weight of the truck and its load.

Also, the use of independent unit on giant pneumatic tires is preferable for many reasons, among others, because the units may be applied to the wheels after the truck gets mired and in such circumstances that as a practical matter it would be impossible to apply any other type of traction device, also any number of such units as required by the circumstances may be applied, in many cases one or two to each drive wheel will be ample, in other special circumstances more may be desirable.

Referring now in detail to the drawings, in which only two forms of my invention are illustrated by way of example, it being recognized that many other forms and variations may be made within the principles of of my invention as claimed, A designates the spokes, B the felly, C the rim and D a pneumatic tire of the larger giant type.

The anti-skid or traction unit illustrated in the first seven views comprises three cross-chains 1 having their respective terminal links, which are of the same series, arranged or threaded on the radially outer bar of a closed loop or holder 2, which has its end portions of its radially inner bar depressed or pressed toward the radially outer bar at 3 to form two end eyes in which are located and held the terminal links of the two outer cross-chains, the intermediate portion of the radially inner bar being bent in the form of a loop 4, the adjacent sides of which prevent movement of the central cross-chain on the radially outer bar between the shoulders 3 of the radially inner bar.

This construction guards against the terminal portions of the cross-chains 1 becoming bunched and forming a stiff lump that might rub against and blister the side of the tire. From actual test it has been found that it is highly important to keep the terminal portions of the cross-chains separated to avoid the above mentioned risk.

It will be noted that the series of links $b$, which threaded through the links $a$, and through each other approximately at the middle portion of each link $a$, do not bear with their inner faces against the corresponding faces of the links $a$, but are independent thereof and freely suspended therein or therethrough and it is therefore important, to insure proper arrangement of the chain and to avoid harmful frictional slip of one series of links of the chain with relation to the other series, to have the terminal links of each cross-chain of the same series, being series $a$ in the unit illustrated, and have this single series of links $a$ bear all pull and strain, though of course the wear incident to frictional contact with the ground will be borne equally by both series of links. The links $b$ are best described as a floating or freely suspended independent series of links which, nevertheless, have a distinct relation in proportion, both as to size of material used and size of individual link, to the links of series $a$, both series having the same degree of twist, which will vary somewhat usually as between particular links but will preferably be within a range of between 90 to 110 degrees measured between planes tangent at the ends of the particular links, whereby a smooth, uniform, flat, filled or substantially solid cross-chain or cross-chain-rope is produced and which, when arranged on the wheel tire, will not become disarranged, or in which one of the series of links will not slip with relation to the other series, and so disturb the arrangement of the links in such manner as to leave a number of relatively large openings between a number of humps of metal. This is of decided importance.

The proportions of each link of each series are such that, for instance in the two series link chain shown in which four links are threaded through each link, the diameter of the cross-section of the end of each link will be very slightly less than one-fourth the distance between the inner faces of the end portions of said link, all of said links being made so nearly as is practical of the same dimensions and form. The above proportions allow just sufficient room to permit the desired flexibility, while said ends and the adjacent portions of the side bars of the links threaded through any given link substantially fill up the space defined by said link, presenting a large and relatively smooth substantially solid bearing surface of the flexible traction element for the tire tread, and producing in effect a flat chain rope. Of course if the number of links threaded through a link be increased then the proportions will vary in accordance with the number of links and the number of series of links will be increased by one-half of the number of additional links threaded through a given link.

In the particular form of unit actually illustrated, to the intermediate loop 4 of one of the holders 2 is connected the tab or anchoring or securing chain 5, preferably by having one of the terminal loops of the tab-chain 5 formed around the radially inner bar of such holder 2 during the manufacture or assembly of the unit.

To apply the particular form of unit shown to a wheel, the cross-chains are preferably arranged on the tire so that the central portion of the middle chain is substantially in line with the axial line of a spoke and so that the radially outer bar of each holder 2 is radially inward of the radially innermost portion of the tire, that is to say, so that the removable tire-rim will be radially beyond the radially outer bar of each holder 2 and, preferably, radially beyond the radially outer ends of the terminal links *a* of the chains 1 connected to the holders 2, to guard against rubbing against the tire by the holders 2 or the terminal links *a* of the cross-chains, which terminal links, because of their connection to the holders 2, are slightly limited in motion or stiff, and also to guard against rubbing against the tire by the tab-chain 5. The tab chain 5 is then passed through the wheel on one side of said spoke, threaded through the intermediate loop 4 of the holder 2 to which it is not permanently attached, then brought back through the wheel on the other side of said spoke and drawn tight, the connector E being threaded into the nearest link of the tab-chain to the loop 4 of the first mentioned holder 2, and then this connector E is hooked into loop 4 of this holder 2. This arrangement will limit the peripheral, or practically prevent, the peripheral, movement of the unit with relation to the wheel. Of course it is not essential that the tab chain 5 illustrated be employed, or that, if used, either of its ends be permanently connected to either holder 2, nor is it essential that the particular form of connector E illustrated be used. While this connector has given satisfactory results, other forms of connectors will suffice.

In the modification shown in Figures 8 and 9, by way of further example only, the construction and operation and mode of application are the same as in the form above described, except that the two outer cross-chains 1 of the said above described form are replaced by cross-chains 1ª considerably smaller in cross-section than central cross-chain 1, this construction resulting in forming a unit, the traction portion of which will slope from the center toward each side and so will substantially reduce the shock or jar caused by the traction portion as it strikes and leaves the ground.

Having thus described my invention, what I claim as new and desire to secure by Letters Patent is:

1. A wheel and a tire mounted thereon, in combination with a traction device mounted on said wheel and comprising a cross-chain extending across the tread of the tire and consisting of two series of longitudinally interthreaded twisted links, and means connected to the terminal links of one of said series of links for securing said cross-chain in mounted relation upon the wheel, whereby the links of each series are left undisturbed with relation to the links of the other series and a uniform flat surface will be presented to the tire tread face.

2. A cross-chain for arrangement across the tread of a vehicle tire, said cross-chain comprising a plurality of longitudinally arranged interthreaded links, each link, except the links at the end portions, having at least four other links threaded through it, the cross-sectional area of each end of each link with relation to the area enclosed by said link being determined by the number of similar links threaded therethrough while just leaving sufficient room for the individual links to turn on each other to permit flexing of the chain, whereby the cross-chain is formed with a composite substantially unbroken surface for engagement by the tire without sacrificing flexibility of the chain.

3. A traction device for arrangement on a wheel and comprising a plurality of cross-chains for arrangement across the tread of the tire thereof, each cross-chain consisting of a plurality of longitudinally arranged interthreaded links, each link, except the links at the end portions, having at least four other links threaded through it, the cross-sectional area of each end of each link with relation to the area enclosed by said link being determined by the number of similar links threaded therethrough while leaving just sufficient room for the individual links to turn on each other to permit flexing of the chain, whereby each cross-chain is formed with a composite substantially unbroken surface for engagement by the tire without sacrificing flexibility of the chain.

4. A wheel and a tire thereon, in combination with a traction device mounted on said wheel and comprising a cross-chain extending across the tread of said tire and consisting of two series of longitudinally interthreaded links, each link of each series being given a substantially uniform twist of at least 90 degrees measured between planes tangent at the ends of the particular links, said links all being twisted in the same direction, and each link of both series being substantially of the same size, proportions and shape as each of the other links of both of said series, whereby a flat smooth surface of a flexible rope-like chain is presented to the surface of the tire.

5. An independent traction unit for arrangement on a wheel and comprising a plurality of cross-chains, in arranged relation, extending across the tread of the wheel tire, each cross-chain consisting of a plurality of series of longitudinally interthreaded twisted links, and means connected to the terminal links of one of said series of links of the respective cross-chains for anchoring said cross-chains on the wheel, whereby the links of each of said series are left undisturbed with relation to the links of the other series and a uniform flat surface will be presented to the tire, the said means being formed to hold said terminal links of the respective cross-chains in spaced arrangement closely adjacent to each other in order that in special conditions of the road the cross-chains may be longitudinally twisted about each other and combine with each other to form a single relatively smooth, thick, chain-rope.

6. A wheel and a tire thereon, in combination with a traction device mounted on said wheel and comprising a traction element comprising end portions consisting of two series of longitudinally interthreaded twisted links, and means connected to the terminal links of one of said series of links of each end portion for connecting said traction element across the tire and for securing said traction element in mounted relation on said wheel, whereby the links of each series of links of each end portion of the traction element are left undisturbed with relation to the links of the other series and a uniform flat surface will be presented toward the tire.

7. A wheel and a tire thereon, in combination with a cross-chain for arrangement across the tread of said tire, said cross-chain comprising a plurality of series of longitudinally interthreaded links, each link, except the links at the end portions, having at least four other similar links threaded through it, the cross-sectional area of each end of each link with relation to the area enclosed by the said link being determined by the number of similar links threaded therethrough while leaving just sufficient room for the individual links to turn on each other to permit flexing of the chain, all of said links having a substantially uniform twist.

8. A cross-chain for arrangement across the tread of a vehicle tire, said cross-chain comprising a plurality of series of longitudinally interthreaded twisted links, one of said series of said links being freely suspended in another of said series, and means connected to the respective terminal links of the latter series for securing said cross-chain transversely across the tread of the tire, whereby the links of each series will be left undisturbed with relation to the links of the other series and a uniform flat surface will be presented to the tire tread face.

9. A traction device for arrangement on a wheel and comprising at least three cross-chains for arrangement across the tread of the tire thereof, said cross-chains being of uniform length and arranged with the sides of the outer cross-chains substantially in engagement with the sides of the central cross-chain, and means for holding the terminal portions of such cross-chains in arranged relation.

LOUIS W. CHISM.